(12) United States Patent
Kumakura et al.

(10) Patent No.: US 7,434,814 B2
(45) Date of Patent: Oct. 14, 2008

(54) WATERPROOF GROMMET

(75) Inventors: Yuichiro Kumakura, Kosai (JP);
Yoshihiko Nakahama, Toyota (JP);
Takanori Kawai, Toyota (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/641,724

(22) Filed: Dec. 20, 2006

(65) Prior Publication Data

US 2007/0143956 A1   Jun. 28, 2007

(30) Foreign Application Priority Data

Dec. 26, 2005   (JP)   ............... 2005-371541

(51) Int. Cl.
*H01B 17/26* (2006.01)
*H01B 17/58* (2006.01)
*H02G 3/22* (2006.01)

(52) U.S. Cl. ............ 277/606; 277/607; 16/2.1; 16/2.2; 174/153 G; 174/152 G; 174/659; 174/668

(58) Field of Classification Search ......... 277/606, 277/607; 16/2.1, 2.2; 174/153 G, 152 G, 174/668, 659
See application file for complete search history.

(56) References Cited

U.S. PATENT DOCUMENTS

| | | | | |
|---|---|---|---|---|
| 2,820,088 A | * | 1/1958 | Sperry | 174/153 G |
| 2,922,836 A | * | 1/1960 | Brown | 277/606 |
| 3,254,153 A | * | 5/1966 | Kohler | 174/93 |
| 4,000,829 A | * | 1/1977 | Johnson et al. | 220/265 |
| 4,959,509 A | * | 9/1990 | Takeuchi et al. | 277/606 |
| 6,353,185 B1 | * | 3/2002 | Sakata | 174/668 |
| 6,525,269 B2 | * | 2/2003 | Sato | 174/660 |
| 6,936,770 B2 | * | 8/2005 | Takedomi et al. | 174/650 |

FOREIGN PATENT DOCUMENTS

| | | |
|---|---|---|
| JP | 05-062552 A | 3/1993 |
| JP | 07-045150 A | 2/1995 |
| JP | 2004-312927 A | 11/2004 |

* cited by examiner

*Primary Examiner*—Alison K Pickard
(74) *Attorney, Agent, or Firm*—Sughrue Mion, PLLC

(57) ABSTRACT

A waterproof grommet, includes an elastic grommet body which is provided with a flange portion to be mounted to a panel; an annular wall which is provided on a first face of the flange portion; a lip portion which is provided on a second face of the flange portion, the second face being opposed to the first face; an annular reinforcing portion which is provided on the second face of the flange portion, and disposed inwardly of the lip portion; and a plurality of wire-passage tubular portions which are provided on the reinforcing portion through respective flexible portions, and are disposed within the annular wall. Proximal ends of the tubular portions are interconnected at a thick wall through the flexible portions. The reinforcing portion is adapted to be inserted into a panel hole of the panel.

4 Claims, 5 Drawing Sheets

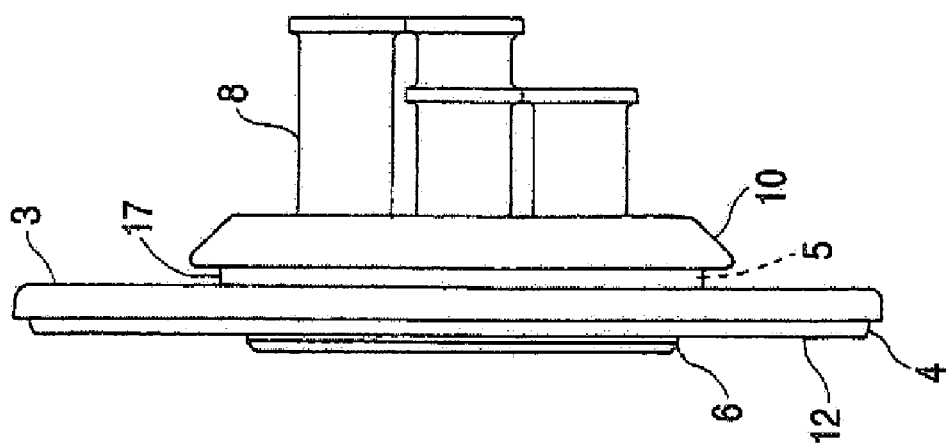
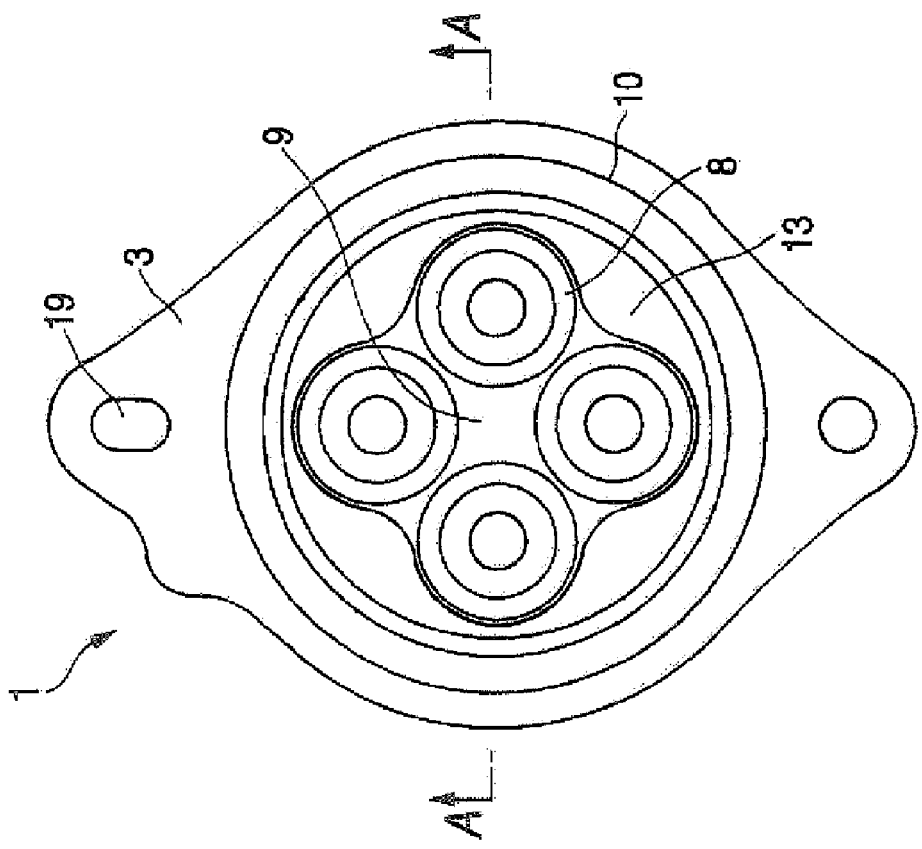

WATERPROOF GROMMET

BACKGROUND OF THE INVENTION

This invention relates to a waterproof grommet which is adapted to be mounted in a hole in a panel of a vehicle or the like, and prevents water and dirt form intruding into the inside of the panel through the hole thereof through which a cable is passed.

FIG. 4 shows one form of related waterproof grommet (see JP-A-5-62552 (FIG. 6)).

This waterproof grommet 31 is fixed to a panel 32 of a vehicle by bolts 33, and comprises a grommet body 34 made of synthetic rubber, and a rigid cover 36 mounted on a flange portion 35 of the grommet body 34.

The grommet body 34 includes a receiving portion 37 for receiving a connector (not shown) connected to a wire, a wire-passage tubular portion 38 extending from the receiving portion 37, and the flange portion 35 formed on an outer surface of the receiving portion 37. Bolt passage holes 39 are formed through the flange portion 35. A lip portion 40 formed on a joining surface of the flange portion 35 is held in intimate contact with the surface of the panel 32, and the flange portion 35 together with a cover 36 is fixed to the panel 32 by the bolts 33 passing through the cover 36 and the flange portion 35 and fastened respectively to nuts 41 on the panel 32.

FIG. 5 shows another form of related waterproof grommet (see JP-A-2004-312927 (FIG. 4)).

This waterproof grommet 42 is made of synthetic rubber, and is fixed to a vehicle panel 43 by fitting a groove 45 (formed in a flange portion 44 of the grommet) on a peripheral edge portion of a hole formed through the panel 43. The grommet 42 includes an annular wall 46 of a generally oval shape extending from an inner peripheral portion of the flange portion 44, and tubular portions (passage portions) 47 formed respectively within round holes formed within the annular wall 46. Pipes 48 or the like are passed through the passage portions 47.

FIG. 6 shows a further form of related waterproof grommet.

This waterproof grommet 51 comprises a grommet body 52 made of synthetic rubber, and a synthetic resin-made inner member 53 fitted in the grommet body 52.

As shown also in FIG. 7, the grommet body 52 includes a round base wall 54, a peripheral wall 55 formed on and extending from an outer peripheral portion of the base wall 54, lip portions 56 formed at a distal end of the peripheral wall 55, and a plurality of wire-passage tubular portions 58 formed on the base wall 54 through respective flexible portions 57 and projecting outwardly. A groove 59 for the fitting of a flange portion 60 of the inner member 53 (FIG. 6) therein is formed in an inner surface of the peripheral wall 55, and is disposed immediately adjacent to a reverse surface of the base wall 54.

The inner member 53 includes an annular portion 61 extending from the round flange portion 60, and a plurality of elastic retaining claws 62 formed on the annular portion 61. A vehicle panel is held between each retaining claw 62 and the lip portions 56 of the grommet body 52. Wires are passed through a hole in the panel, and are passed respectively through the tubular portions 58, and each wire is fixed to the tubular portion 58 by winding a tape. In this condition, the waterproof grommet 51 is fixed to the vehicle panel. High-voltage wires or the like for an electric car or the like are used as the wires.

However, when a large pulling force, a bending force or the like acted on the wire fixed to the above related waterproof grommet 51 (FIGS. 6 and 7) fixed to the vehicle panel, the grommet body 52 was pulled, for example, in a direction away from the panel, and therefore it was feared that the intimate contact of the lip portions 56 with the panel surface might be lowered.

SUMMARY OF THE INVENTION

With the foregoing in view, it is an object of this invention to provide a waterproof grommet which secures intimate contact between a grommet body and a panel surface even when a pulling force, a bending force or the like acts on a wire, thereby maintaining a good waterproof sealing performance.

In order to achieve the above object, according to the present invention, there is provided a waterproof grommet, comprising:

an elastic grommet body which is provided with a flange portion to be mounted to a panel;

an annular wall which is provided on a first face of the flange portion;

a lip portion which is provided on a second face of the flange portion, the second face being opposed to the first face;

an annular reinforcing portion which is provided on the second face of the flange portion, and disposed inwardly of the lip portion; and a plurality of wire-passage tubular portions which are provided on the reinforcing portion through respective flexible portions, and are disposed within the annular wall, wherein proximal ends of the tubular portions are interconnected at a thick wall through the flexible portions; and wherein the reinforcing portion is adapted to be inserted into a panel hole of the panel.

With this construction, the flange portion is reinforced by the annular reinforcing portion, and the flange portion is less liable to be elastically deformed, and therefore the sealing lip portion of the flange portion is closely contacted with the surface of the panel with no gap formed therebetween. This effect is conspicuous particularly when a pulling force, a bending force or the like acts on wires passed through and fixed to the respective tubular portions. The flexible portions relieve a pulling force, a compressive force and a bending force acting on the tubular portions. Preferably, the reinforcing portion is formed integrally with the annular wall in order to increase the strength (rigidity). The reinforcing portion also serves as an insertion guide/positioning portion relative to the panel hole. Furthermore, the tubular portions extend upwardly from the reinforcing portion (formed on the reverse surface of the flange portion) through the flexible portions, and the proximal ends of the tubular portions are disposed at a low position (Preferably, the proximal ends of the tubular portions are disposed on an extension of the flange portion.), so that the vertical distance from the proximal ends of the tubular portions to a distal end of the lip portion is shortened. Therefore, adverse effects of the bending (tilting), etc., of the tubular portions are less liable to be transmitted to the lip portion, so that the lowering of intimate contact between the lip portion and the panel surface is prevented.

Preferably, the thick wall interconnects the tubular portions at the center of the annular reinforcing portion, and increases the rigidity of the interconnecting portions, so that the tubular portions are less liable to be tilted upon application of a bending force, etc. By pressing the thick wall, the wire can be passed through the tubular portion, and also the grommet body can be mounted in the panel hole.

Preferably, the reinforcing portion is formed integrally with the annular wall.

With this construction, the strength (rigidity) of the reinforcing portion is increased by the annular wall. The reinforcing portion is formed integrally with the annular wall, and projects in a direction opposite to the direction of projecting of the annular wall. Here, the term "integrally" means not only that the reinforcing portion is disposed accurately in registry with the annular wall but also that the reinforcing portion is slightly offset radially of the annular wall within the range of the thickness of the annular wall.

Preferably, the reinforcing portion is generally equal in thickness to the annular wall, and is greater in thickness than the flange portion.

With this construction, the annular wall and the reinforce wall positively receive a deforming force of the tubular portions, and positively prevent the adverse effects from being transmitted to the flange portion. Therefore, the elastic deformation of the flange portion is prevented, and the lip portion satisfactorily contacts the panel surface with a suitable contact pressure. The flange portion is deformed according to the shape (warp, etc.,) of the panel surface, and causes the lip portion to be positively contacted with the panel surface.

Preferably, the thick wall is disposed inwardly of the reinforcing portion, and is greater in thickness than the reinforcing portion.

With this construction, the thick wall is disposed within an inside space of the reinforcing portion, and is recessed from the distal end of the reinforcing portion, and therefore the thick wall is prevented from interference with the exterior (the panel, etc.,), and for example when mounting the grommet body on the panel, the thick wall is prevented from being caught by the panel. And besides, since the thick wall is larger in thickness than the reinforcing portion, the tubular portions are positively interconnected by the thick wall of an increased weight, so that bending deformation (tilting), compressive deformation, etc., of the tubular portions are positively suppressed. When the worker, while pressing an outer surface of the thick wall, passes the wires through the tubular portions, or inserts the reinforcing portion into the panel hole, the thick wall will not be bent, the efficiency of the operation is enhanced.

Preferably, a claw portion is provided on the annular wall outwardly; and wherein a rigid cover which covers the flange portion and annular wall is attached on the flange portion.

With this construction, an annular portion of the cover is fitted in a gap between the claw portion and the flange portion, so that the cover is fixed to the grommet body. The claw portion is elastically deformed inwardly, and is inserted into an annular portion of the cover, and then is elastically restored to retain the cover. The cover protects the grommet body, and also makes it possible to positively tighten bolts at the time of fixing the flange portion to the panel.

In the above configuration, the proximal ends of the wire-passage tubular portions are disposed at the low position, and therefore adverse effects of the deformation of the tubular portions are less liable to be transmitted to the flange portion, and also the annular reinforcing portion functions so as not to transmit the deformation of the tubular portions to the flange portion, and besides the thick wall makes the tubular portions less liable to be deformed. With these synergistic effects, the intimate contact of the lip portion of the flange portion with the panel is always kept good, thereby enhancing the waterproof sealing performance.

In the above configuration, the strength of the reinforcing portion is increased, and therefore the effect of the reinforcing portion, that is, the effect of making the deformation of the tubular portions less liable to be transmitted to the flange portion, is promoted, so that the waterproof sealing performance is further enhanced.

In the above configuration, the annular wall and the reinforcing portion positively receive the deforming force of the tubular portions, and secure the intimate contact of the lip portion of the flange portion, and the flange portion flexibly responds to warp, etc., of the panel surface, thereby securing the good waterproof sealing performance.

In the above configuration, the effect of the thick wall is promoted, and therefore the lowering of the sealing performance due to the tilting, etc., of the tubular portions is more positively prevented, and also the operation for passing the wires through the respective tubular portions by pressing the thick wall, as well as the operation for inserting the reinforcing portion into the panel hole by pressing the thick wall, can be effected more efficiently.

In the above configuration, the cover is fixed by the claw portion, and by doing so, it is not necessary to provide a retaining portion for the cover, and the cover is simplified in structure, and is formed into a low-cost design, and besides the lifting of the flange portion of the cover is prevented, thereby enhancing the waterproof sealing performance.

BRIEF DESCRIPTION OF THE DRAWINGS

The above objects and advantages of the present invention will become more apparent by describing in detail preferred exemplary embodiments thereof with reference to the accompanying drawings, wherein:

FIG. 2A is a plan view of the waterproof grommet, and FIG. 2B is a side-elevational view thereof;

DETAILED DESCRIPTION OF THE PREFERRED EMBODIMENTS

Figure 1:
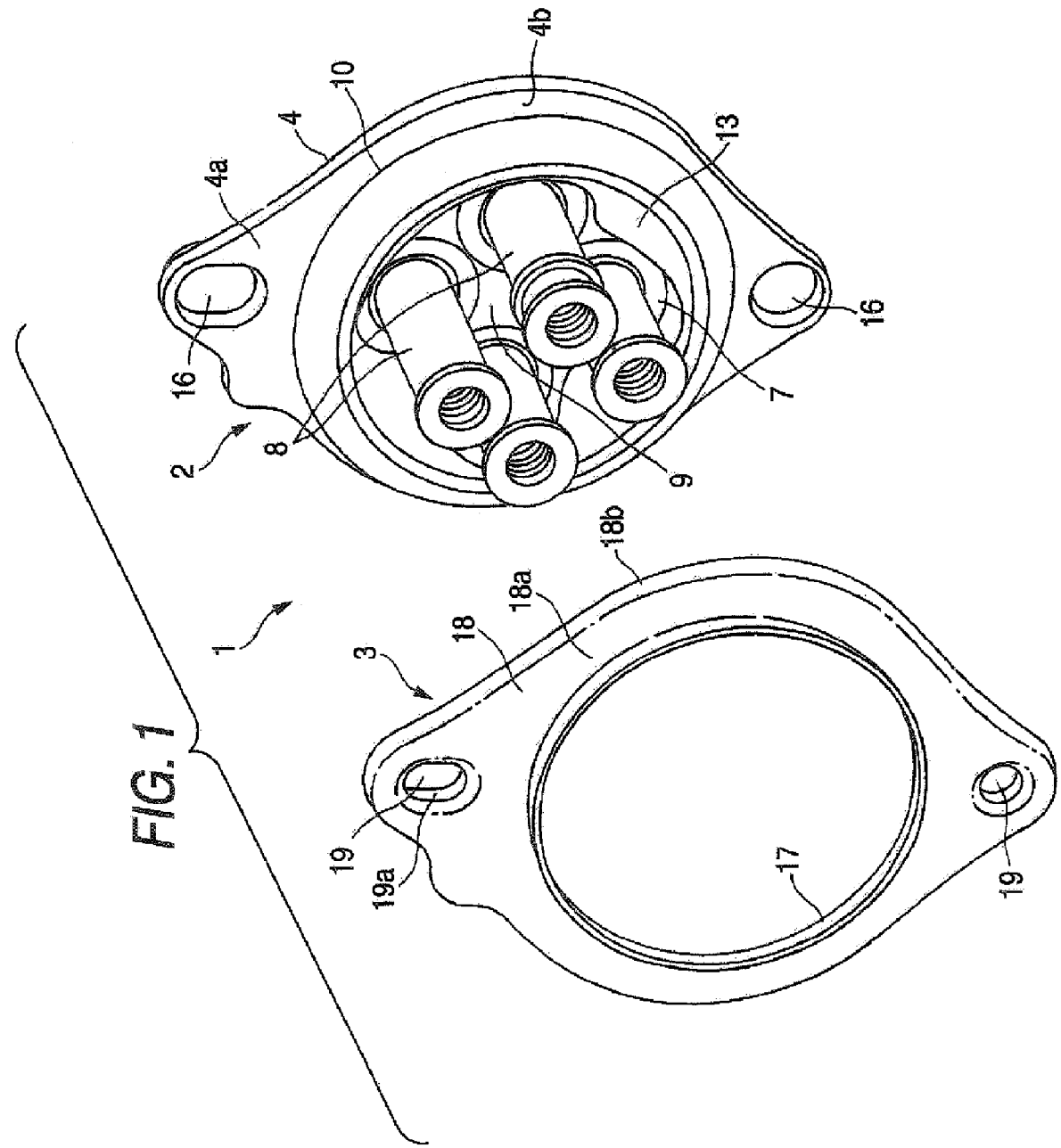
FIG. 1 is an exploded, perspective view of one preferred embodiment of a waterproof grommet of the present invention.
Figure 3:
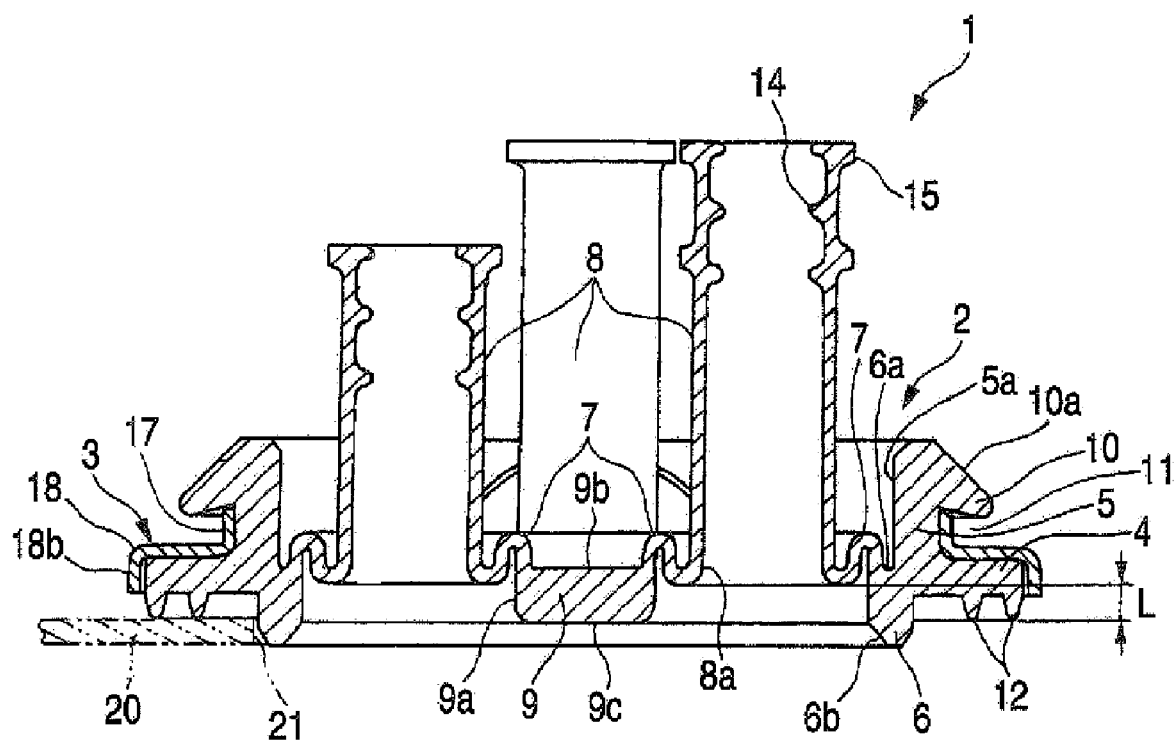
FIG. 3 is a cross-sectional view taken along the line A-A of FIG. 2A.
Figure 4:
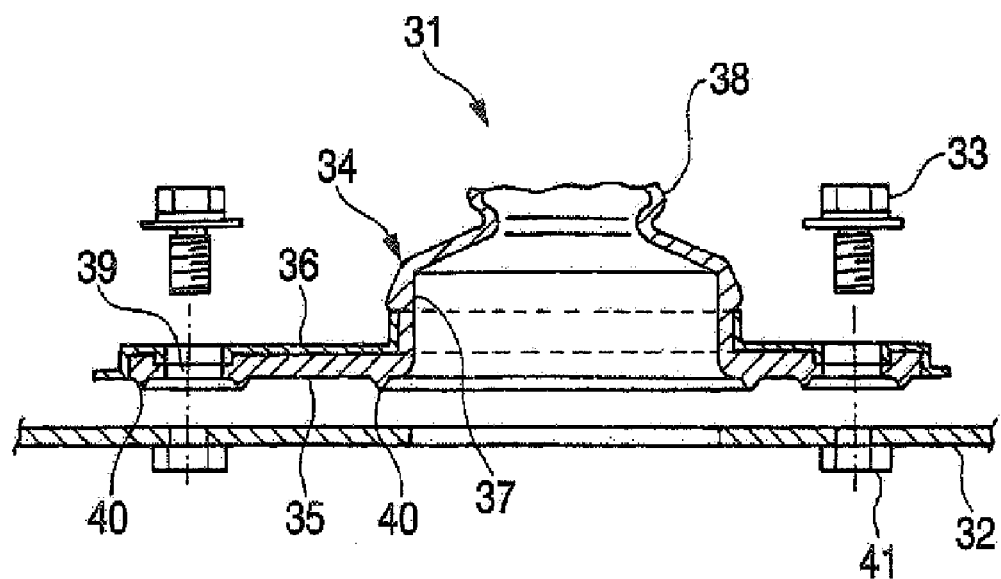
FIG. 4 is a cross-sectional view showing one form of related waterproof grommet.
Figure 5:
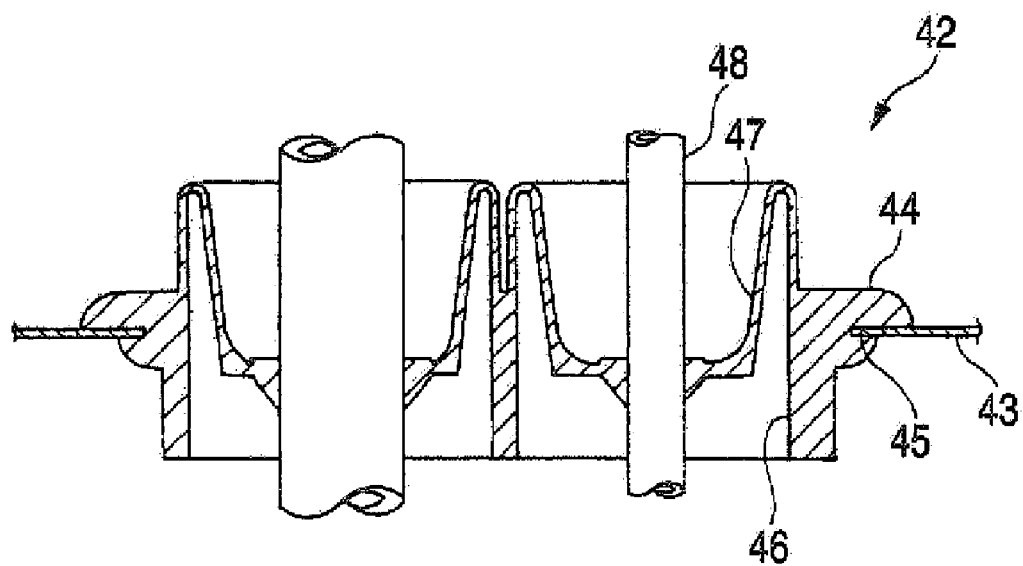
FIG. 5 is a cross-sectional view showing another form of related waterproof grommet.
Figure 6:
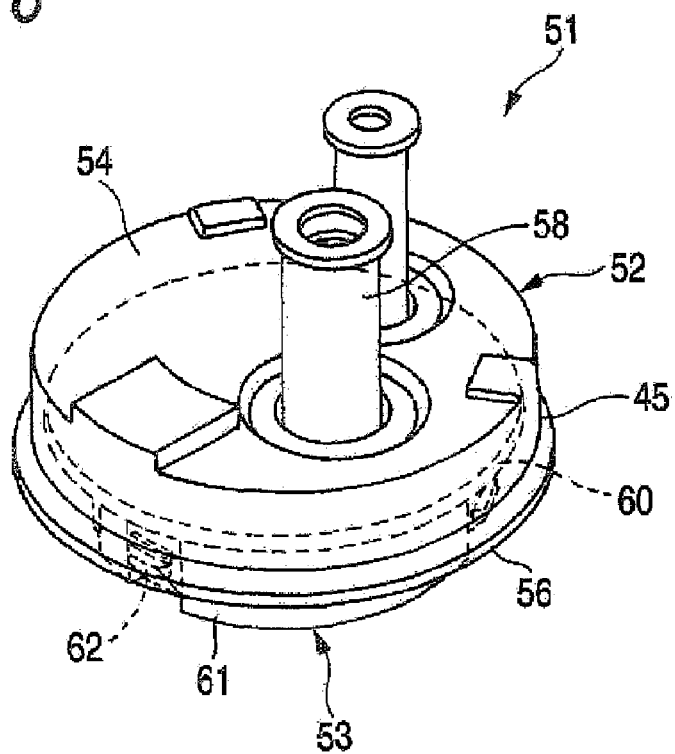
FIG. 6 is a perspective view showing a further form of related waterproof grommet.

FIGS. 1 to 3 show one preferred embodiment of a waterproof grommet of the present invention.

As shown in FIG. 1 (which is an exploded perspective view), this waterproof grommet 1 includes an elastic grommet body 2 made of synthetic rubber, and a synthetic resin-made rigid cover (reinforcing member) 3 mounted on a flange portion 4 of the grommet body 2. The grommet 1 is fixed to a panel 20 (FIG. 3) of a door or other portion of a vehicle by bolts.

As shown in FIG. 1 and FIG. 3 (which is a cross-sectional view taken along the line A-A of FIG. 2A), the grommet body 2 includes an annular wall 5 (FIG. 3) of a round shape, the flange portion 4 formed integrally on an outer surface of the annular wall 5, an annular round reinforcing wall 6 (FIG. 3) which is disposed inwardly of the annular wall 5, and is formed integrally with and projects downwardly (that is, in a direction away from the annular wall 5) from the flange portion 4 in perpendicular relation thereto, a plurality of (four in this embodiment) wire-passage tubular portions 8 which are disposed inwardly of the annular wall 5, and are integrally connected to an upper end 6a of the reinforcing wall 6 through respective thin flexible portions 7 on an inward extension of the flange portion 4, and project higher than the annular wall 5, and a thick wall 9 which is formed at a central portion of the grommet body 2 surrounded by the plurality of tubular portions 8, and is integrally connected to the flexible portions 7, and is thickened to project in a direction of projecting of the reinforcing wall 6. In the present specification, the terms in connection with the directions (upper, lower, left, right, etc.,) are used merely for illustration purposes, and do not necessarily coincide with the directions for the actually mounted waterproof grommet 1.

As shown in FIG. 3, a claw-like wall 10 of a triangular cross-section is formed integrally on and projects from an upper portion of the outer peripheral surface of the vertical annular wall 5, and is smaller in outer diameter than the flange portion 4, and has a slanting surface 10a defining an outer surface thereof. The claw-like wall 10 is disposed in opposed relation to the horizontal flange portion 4, and a circumferential groove 11 is formed between the claw-like wall 10 and the flange portion 4. Two annular lip portions 12 for sealing purposes are formed on a bottom surface of the flange portion 4 in concentric relation to each other. The annular reinforcing wall 6 is disposed inwardly of the pair of lip portions 12, and projects downwardly beyond the lip portions 12. Inner and outer surfaces of a lower end portion of the reinforcing wall 6 are chamfered to form tapering or chamfering surfaces 6b, respectively, and upper ends of these chamfering surfaces 6b are disposed in a plane in which a lower surface of the thick wall 9 lies.

The annular wall 5 projects from the upper (front) surface of the flange portion 4, and the reinforcing wall 6 projects from the lower (reverse) surface of the flange portion 4. An inner surface 5a of the annular wall 5 is disposed generally centrally of the wall thickness of the reinforcing wall 6, and is integrally connected to the upper end 6a in perpendicular relation thereto. Like the annular wall 5, the reinforcing wall 6 is thickened, and the flange portion 4 is slightly smaller in thickness than the reinforcing wall 6 and the annular wall 5. The central thick wall 9 is larger in thickness than the reinforcing wall 6 and the annular wall 5.

The inner surface 5a of the annular wall 5 is connected at its lower end to the upper end 6a of the reinforcing wall 6 in perpendicularly-intersecting relation thereto, and within the annular wall 5, the flexible portions 7 extend upwardly from the upper end 6a of the reinforcing wall 6, and each of the flexible portions 7 is bent inwardly to assume a recumbent S-shaped cross-section, and is integrally connected to a peripheral wall of the corresponding tubular portion 8. As shown in FIGS. 1 and 2A, each of the flexible portions 7, when viewed from the top, has a round annular shape, and the flexible portion 7 is integrally connected to the inner surface 5a of the annular wall 5 by a membrane-like portion 13 as it goes inwardly away from the annular wall 5.

The thick wall 9 is disposed at the central portion surrounded by the tubular portions 8, and the flexible portions 7 extend upwardly from an outer peripheral surface 9a (FIG. 3) of the thick wall 9, and each of the flexible portions 7 is bent outwardly to assume a recumbent S-shaped cross-section, and is integrally connected to the peripheral wall of the corresponding tubular portion 8. Proximal ends 8a of the tubular portions 8 are interconnected by the thick wall 9 through the flexible portions 7. An upper surface 9b of the thick wall 9 is exposed to the exterior, and within the annular reinforcing wall 6, a lower surface 9c of the thick wall 9 is disposed at a level slightly higher than the lower end of the reinforcing wall 6.

Lip portions 14 for sealing purposes are formed on an upper portion of an inner peripheral surface of the tubular portion 8, and projections 15 are formed on an upper portion of an outer peripheral surface of the tubular portion 8. A wire (not shown), passed through the tubular portion 8, can be fixed to the projections 15, for example, by winding a tape or by a band. One end of the wire is connected to a power source, and the other end of the wire is connected, for example, to an auxiliary equipment or the like provided in the door. For example, high-voltage wires for an electric car or the like can be used as the wires. In this embodiment, the four tubular portions 8 are arranged at equal intervals in the forward-rearward direction and the left-right direction.

As shown in FIG. 1, the flange portion 4 includes front and rear larger-diameter portions 4a, and left and right smaller-diameter portions 4b. Bolt-passage holes 16 are formed through the larger-diameter portions 4a, respectively. As shown in FIGS. 2 and 3, the cover 3 for reinforcing purposes is mounted on the upper surface of the flange portion 4. The cover 3 may be called a plate.

As shown in FIG. 1, the cover 3 includes a round annular portion 17, and a flange portion 18 formed integrally around an outer periphery of the annular portion 17. The cover 3 safely protects the grommet body 2 from interference with the exterior, and also imparts rigidity to the grommet body 2 to prevent the flange portion 4 from lifting, thereby enhancing a waterproof sealing performance. The annular portion 17 projects upwardly, and has a small height. As shown in FIG. 3, the annular portion 17 is fitted into the groove 11 in the grommet body 2 to fix the cover 3 to the grommet body 2. The slanting surface 10a of the claw-like wall 10 of the grommet body 2 serves as a sliding-contact guide surface when passing the annular portion 17 of the cover 3 past the claw-like wall 10.

The flange portion 18 of the cover 3 includes a horizontal main wall 18a, and a vertical bent wall 18b. Bolt-passage holes 19 are formed respectively through larger-diameter portions of the main portion 18, and inner peripheral walls 19a for respectively covering the holes 16 in the grommet body 2 are formed in the holes 19, respectively. The main wall 18a covers the upper surface of the flange portion 4 of the grommet body 2, and the bent wall 18b covers the outer peripheral surface of the flange 4. The annular portion 17 causes the annular wall 5 (FIG. 3) of the grommet body 2 to extend vertically upwardly from the flange portion 4, thereby reinforcing the annular wall 5.

In an operation for mounting the cover 3, the grommet body 2 is placed on a working bench in such a manner that the reinforcing wall 6 (FIG. 3) or the flange portion 4 is horizontally put on the working bench with the tubular portions 8 directed upwardly. In this condition, the cover 3 is pressed hard against the claw-like wall 10 of the grommet body 2 from the upper side, so that the claw-like wall 10 is elastically deformed inwardly to allow the annular portion 17 of the cover 3 to pass past it, thereby effecting this cover mounting operation.

Here, when the claw-like wall 10 and the flexible portions 7 are bent inwardly (downwardly) in the case where the reinforcing wall 6 is placed on the working bench, the thick wall 9 is pressed against an upper surface of the working bench to support a pressing force, thereby suppressing the compressive deformation of the reinforcing wall 6, and therefore the mounting operation for the cover 3 can be smoothly and positively carried out. Also, when the claw-like wall 10 is bent inwardly in the case where the flange portion 4 is placed on the working bench with the reinforcing wall 6 inserted in a hole in the working bench, the thick wall 9 keeps the rigidity to suppress the inward tilting of the tubular portions 8, thereby enhancing an elastic restoring force of the claw-like wall 10, so that the efficiency of the cover mounting operation is enhanced.

In the condition of FIGS. 2 and 3 in which the cover 3 is mounted on the grommet, the wires (not shown) are passed respectively through the tubular portions 8, and are fixed respectively to the tubular portions 8, for example, by winding a tape, so that part of a wire harness is formed by the plurality of wires and the waterproof grommet 1.

The thick wall 9 is disposed at the central portion surrounded by the tubular portions 8, and therefore when passing each wire through the tubular portion 8, the worker presses the thick wall 9 downwardly with the hand (that is, presses the outer surface 9b of the thick wall 9 toward the inner or lower surface 9c in a direction opposite to the direction of passing of the wires), so that the wire can be smoothly and easily passed through the tubular portion 8, and therefore the efficiency of the wire passing operation is enhanced in a process of producing the wire harness. The outer surface 9a of the thick wall 9 can be easily pressed by inserting the hand and fingers through a gap between the tubular portions 8.

In the condition in which the wires are passed through the waterproof grommet 1, the reinforcing wall 6 (FIG. 3) of the grommet body 2 is inserted into a hole in the vehicle panel 20, and the lip portions 12 of the flange portion 4 of the grommet body 2 are brought into intimate contact with the front surface of the panel 20, and in this condition the flange portion 4 is fixed to the panel 20 by the bolts passing sequentially through the cover 30 and the flange portion 4 and fasted respectively to nuts on the reverses surface of the panel 20. In the case where the bolts are stud bolts which are set in the panel 20, the nuts are tightened at the outer (upper) surface of the cover 3.

When mounting the grommet body 2 on the panel 20, the reinforcing wall 6 serves as an insertion guide/positioning portion relative to the hole (panel hole) 20 in the panel 20 (FIG. 3). The lip portions 12 of the flange portion 4 are compressed to achieve a positive waterproof sealing performance. The bent wall 18b (FIG. 3) of the cover 3 serves as a stopper for preventing the compression of the lip portions 12 outwardly beyond this bent wall 18b. When inserting the reinforcing wall 6 into the hole in the panel 20, the worker presses the outer surface 9b of the central thick wall 9 toward the inner surface 9c, and by doing so, the round annular reinforcing wall 6 can be smoothly inserted into the hole in the panel 20 without being tilted or caught.

When the waterproof grommet 1 is fixed to the vehicle panel 20 by the bolts, a rebelling force, such as a compressive force or a pulling force in the longitudinal direction, a bending force, a twisting force and others, acts on each wire fixed to the tubular portion 8, for example, by winding a tape. However, the flexible portions 7 absorb these forces to a certain degree, and also the thick reinforcing wall 6 and the thick wall 9 positively receive the forces which have failed to be absorbed, thereby positively preventing the lifting of the flange portion 4 from the panel surface and the resulting incomplete contact between the lip portions 12 and the panel surface.

Figure 7:
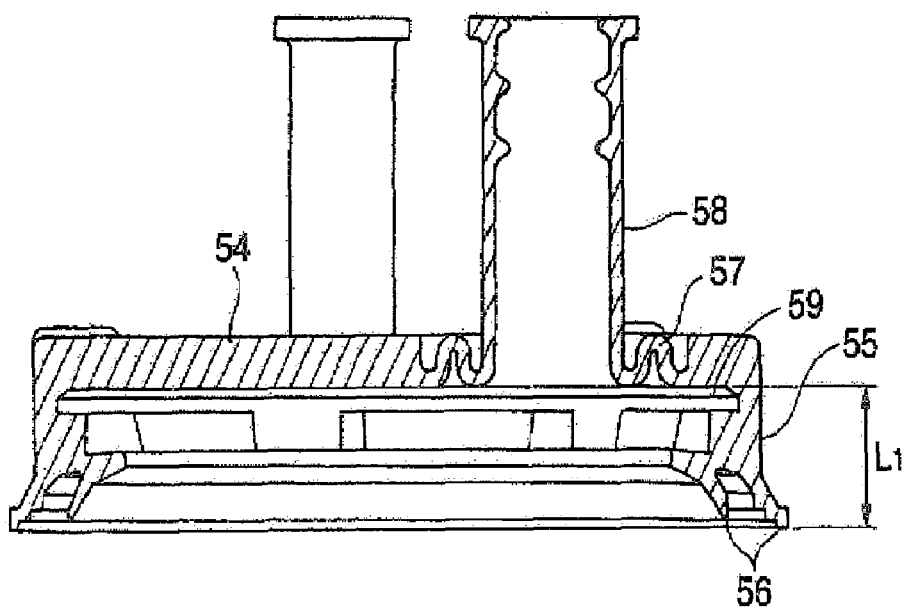
FIG. 7 is a cross-sectional view showing an elastic grommet body of the waterproof grommet of FIG. 6.

This effect is promoted also by the fact that the distance L (FIG. 3) from the proximal end 8a of each tubular portion 8 to the distal ends of the lip portions 12 in the waterproof grommet 1 of this embodiment is smaller as compared with the related waterproof grommet (FIG. 7). Namely, even when for example, a strong pulling force, a strong bending force or the like acts on the wire, the amount of elastic deformation of the grommet body 2 in the vertical direction is smaller because of the short vertical distance L between the proximal end 8a of each tubular portion 8 and the distal ends of the lip portions 12, and therefore the amount of lifting of the lip portions 12 from the panel surface is smaller, so that the good waterproof performance is secured.

Particularly when the tubular portion 8 is tilted by a bending force, the above effect is conspicuous. Namely, in the related example (FIG. 7), the vertical length $L_1$ from the proximal end of each tubular portion to the distal ends of the lip portions is larger, and therefore a torque which is the product of the bending force and the vertical distance $L_1$ is larger, so that a large pulling-up force (lifting force) or a squeezing force in an opposite direction acts on the lip portions. However, in the embodiment of FIG. 3, the distance L from the proximal ends 8a of the tubular portions 8 and the distal ends of the lip portions 12 is smaller, and therefore the torque is smaller, so that a lifting force or a squeezing force, acting on the lip portions 12, is reduced, and the lip portions 12 are held against the panel surface with a proper contact pressure, and the good waterproof sealing performance is secured.

In the above embodiment, although the cover 3 is used as the reinforcing member, the use of the cover 3 can be omitted, and the grommet body 2 can be used as it is, or rigid collars can be provided respectively in the holes 16 in the flange portion 4 of the grommet body 2, and the grommet body 1 can be fastened to the panel by tightening the bolts. In the case where the cover 3 is not used, the force of pressing of the flange portion 4 of the grommet body 2 against the panel 20 is lowered, and to compensate for this, the harness of the rubber material of which the grommet body 2 is made can be increased, or only the flange portion 4 can be made of rigid rubber or the like by two-color molding. In the case where the cover 3 is not used, the formation of the claw-like wall 10 is not necessary. In the above embodiment, although the claw-like wall 10 has the annular shape, it can be interrupted in the circumferential direction.

Furthermore, in the above embodiment, although the four wire-passage tubular portions 8 are arranged at equal intervals, the number of the tubular portions can be suitably set to a desired number such as three, two, etc., according to an associated circuit. Furthermore, the grommet body 2 can be fixed to the panel 20 not by the bolts but by retaining clips or the like retainingly engaged in respective small holes in the panel 20. The retaining clip is of the known type having elastic claws formed at a distal end of a stem portion thereof. The retaining clips can be formed integrally with or insert molded in the cover 3 or the flange portion 4 of the grommet body 2.

In the above embodiment, although the reinforcing wall 6 is formed integrally at the lower side of the annular wall 5, and is slightly offset radially inwardly thereof, the reinforcing wall 6 can be formed integrally right beneath the annular wall 5, that is, in vertical registry therewith. In the case where the reinforcing wall 6 is allowed to have a slightly lower strength, the reinforcing wall 6 can be formed to be completely spaced apart from the annular wall 5.

Furthermore, in the above embodiment, the flexible portions 7 are disposed on the inward extension of the flange portion 4, so that the vertical distance L form the proximal end 8a of each tubular portion 8 to the distal ends of the lip portions 12 of the flange portion 4 can be made as smaller as possible. However, for example, each flexible portion 7 can project long upwardly from the upper end 6a of the reinforcing wall 6 slightly beyond the upper surface of the flange portion 4, or can extend upwardly not from the upper end 6a of the reinforcing wall 6 but from the inner peripheral surface of the reinforcing wall 6, or can extend upwardly from that portion of the inner surface of the reinforcing wall disposed below the flange portion 4.

The construction of the above embodiment is effective not only as the waterproof grommet 1 but also as the structure of mounting the waterproof grommet 1, for example, on the panel 20.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2005-371541 filed on Dec. 26, 2005, the contents of which are incorporated herein for reference.

What is claimed is:

1. A waterproof grommet, comprising:
   an elastic grommet body which is provided with a flange portion to be mounted to a panel;
   an annular wall extending in a first direction from a first face of the flange portion;
   a lip portion extending in a second, opposite, direction from a second face of the flange portion, the second face being opposite the first face;
   an annular reinforcing portion which is provided on the second face of the flange portion, and disposed inwardly of the lip portion; and
   a plurality of wire-passage tubular portions which are provided on the reinforcing portion through respective flexible portions, and are disposed within the annular wall, said tubular portions extending in the first direction beyond the annular wall,
   wherein proximal ends of the tubular portions are interconnected at a thick wall through the flexible portions;
   wherein the reinforcing portion extends substantially around the entire periphery of the grommet body and is adapted to be inserted into a panel hole of the panel;
   wherein an extending length of the reinforcing portion from the second face is longer than an extending length of the lip portion from the second face and an end portion of the lip portion in the second direction comes in abutting contact with the panel;
   wherein a claw portion is provided on the annular wall outwardly; and
   wherein a rigid cover which covers the flange portion and annular wall is attached on the flange portion.

2. The waterproof grommet according to claim 1, wherein the reinforcing portion is formed integrally with the annular wall.

3. The waterproof grommet according to claim 1, wherein the reinforcing portion is generally equal in thickness to the annular wall, and is greater in thickness than the flange portion.

4. The waterproof grommet according to claim 1, wherein the thick wall is disposed inwardly of the reinforcing portion, and is greater in thickness than the reinforcing portion.

* * * * *